(12) United States Patent
Yokota et al.

(10) Patent No.: US 7,436,805 B2
(45) Date of Patent: Oct. 14, 2008

(54) METHOD FOR CALL ESTABLISHMENT OVER A PACKET EXCHANGE NETWORK

(75) Inventors: Hidetoshi Yokota, Saitama (JP); Osamu Kobayashi, Saitama (JP); Akira Idoue, Saitama (JP)

(73) Assignee: KDDI Corporation, Tokyo (JP)

( * ) Notice: Subject to any disclaimer, the term of this patent is extended or adjusted under 35 U.S.C. 154(b) by 669 days.

(21) Appl. No.: 10/988,604

(22) Filed: Nov. 16, 2004

(65) Prior Publication Data

US 2005/0111411 A1 May 26, 2005

(30) Foreign Application Priority Data

Nov. 21, 2003 (JP) ............................. 2003-392103

(51) Int. Cl.
*H04Q 7/00* (2006.01)
(52) U.S. Cl. .................. 370/331; 370/466; 455/436
(58) Field of Classification Search ............... 370/331, 370/466, 379, 338; 455/436–439
See application file for complete search history.

(56) References Cited

U.S. PATENT DOCUMENTS

2002/0181498 A1* 12/2002 Hsu et al. .................... 370/466
2006/0013170 A1* 1/2006 Shin et al. .................... 370/338

OTHER PUBLICATIONS

Simpson, "The Point to Point Protocol (PPP)", RFC 1661, Jul. 1994.
P.R0001 Version 1.0, "Wireless IP Architecture based on IETF Protocols", 3GPP2, Jul. 2000.
P.S0001-A Version 3.0.0, "Wireless IP Network Standard", 3GPP2, Jul. 2001.
Simpson, "PPP Challenge Handshake Authentication Protocol (CHAP)", RFC 1994, Aug. 1996.
A.S0007-0 Version 1.0, "1xEV-DO Inter-Operability Specification (IOS) for CDMA 2000 Access Network Interfaces", 3GPP2, Jun. 2001.

* cited by examiner

*Primary Examiner*—CongVan Tran
(74) *Attorney, Agent, or Firm*—Westerman, Hattori, Daniels & Adrian, LLP.

(57) ABSTRACT

The present invention provide a method for call establishment over a packet exchange network which is capable of saving the time required for a call establishment of the PPP by reducing redundant steps for authentication in a SIP call, and to reduce the incoming data amount. The present invention comprising the following steps. Step (a): The TE requests the PDSN for CHAP authentication. This message is received by the AT on behalf of the PDSN. Step (b): The AT requests the TE for the CHAP authentication on behalf of the PDSN, and the maximum packet size MRU receivable by the PTSN is transmitted to the TE. Step (c): The AT accepts the CHAP authentication on behalf of the PDSN. Step (d): The TE accepts the CHAP authentication and the MRU of the PDSN. This message is also received by the AT on behalf of the PDSN.

10 Claims, 11 Drawing Sheets

STANDARD PPP CHAP CHALLENGE

| CODE | ID | LENGTH |
|---|---|---|
| VALUE-SIZE | CHALLENGE VALUE | |
| | | |
| | NAME | |

STANDARD PPP CHAP RESPONSE

| CODE | ID | LENGTH |
|---|---|---|
| VALUE-SIZE | VALUE (CHAP RESPONSE) | |
|  |  |  |
|  |  |  |
|  |  |  |
|  | NAME (=USERNAME) | |

STANDARD PPP PAP REQUEST

| CODE | ID | LENGTH |
|---|---|---|
| USERNAME LEN. | USERNAME | |
| PASSWORD LEN. | PASSWORD | |

| 00:a | 08:i | 10:q | 18:y | 20:G | 28:O | 30:W | 38:4 |
|---|---|---|---|---|---|---|---|
| 01:b | 09:j | 11:r | 19:z | 21:H | 29:P | 31:X | 39:5 |
| 02:c | 0a:k | 12:s | 1a:A | 22:I | 2a:Q | 32:Y | 3a:6 |
| 03:d | 0b:l | 13:t | 1b:B | 23:J | 2b:R | 33:Z | 3b:7 |
| 04:e | 0c:m | 14:u | 1c:C | 24:K | 2c:S | 34:0 | 3c:8 |
| 05:f | 0d:n | 15:v | 1d:D | 25:L | 2d:T | 35:1 | 3d:9 |
| 06:g | 0e:o | 16:w | 1e:E | 26:M | 2e:U | 36:2 | 3e: |
| 07:h | 0f:p | 17:x | 1f:F | 27:N | 2f:V | 37:3 | 3f: |

FIRST ENCODE TABLE

Fig. 13

| 00: | | 30:0 | 41:A | 61:a | |
|---|---|---|---|---|---|
| 01: | | 31:1 | 42:B | 62:b | |
| 02: | | 32:2 | 43:C | 63:c | |
| | | 33:3 | 44:D | 64:d | |
| | | 34:4 | 45:E | 65:e | |
| ⋮ | ⋮ | ⋮ | ⋮ | ⋮ | 7f:· |

SECOND ENCODE TABLE

Fig. 14

| 80: .ezweb.ne.jp |
| 81: .yahoo.com |
| 82: .dion.ne.jp |
| 83: .co.jp |
| 84: .jp |

THIRD ENCODE TABLE

Fig. 15 yokota@yahoo.com

[0x18] [0x0e] [0x0a] [0x0e] [0x13] [0x00] [0x3f] [0x3e] (81).
  ‖     ‖     ‖     ‖     ‖     ‖     ‖     ⎵⎵⎵⎵⎵⎵⎵
 「y」  「o」  「k」  「o」  「t」  「a」  「@」  「yahoo.com」

= 6bits × 8 + 1octet = 7octes

[ ] : 6bits
( ) : 8bits

COMPRESSION RATIO 7/16 = 43.75%

Fig. 16

XX@XX.XXX.XX

XX@XX@XX.XXX.XX

METHOD FOR CALL ESTABLISHMENT OVER A PACKET EXCHANGE NETWORK

BACKGROUND OF THE INVENTION

1. Field of the Invention

The present invention relates to a method for call establishment over a packet exchange network at a high speed according to the procedure conforming to the PPP (Point to Point Protocol).

2. Description of the Related Art

As a transport layer protocol for connecting with the Internet, the TCP (Transmission Control Protocol) has been widely used. When a terminal connects with the Internet via a public network, the PPP (Point to Point Protocol) is generally used. The PPP is also adopted in the third generation mobile phone standard system, cdma2000, for a call establishment in the data communications.

Figure 11:
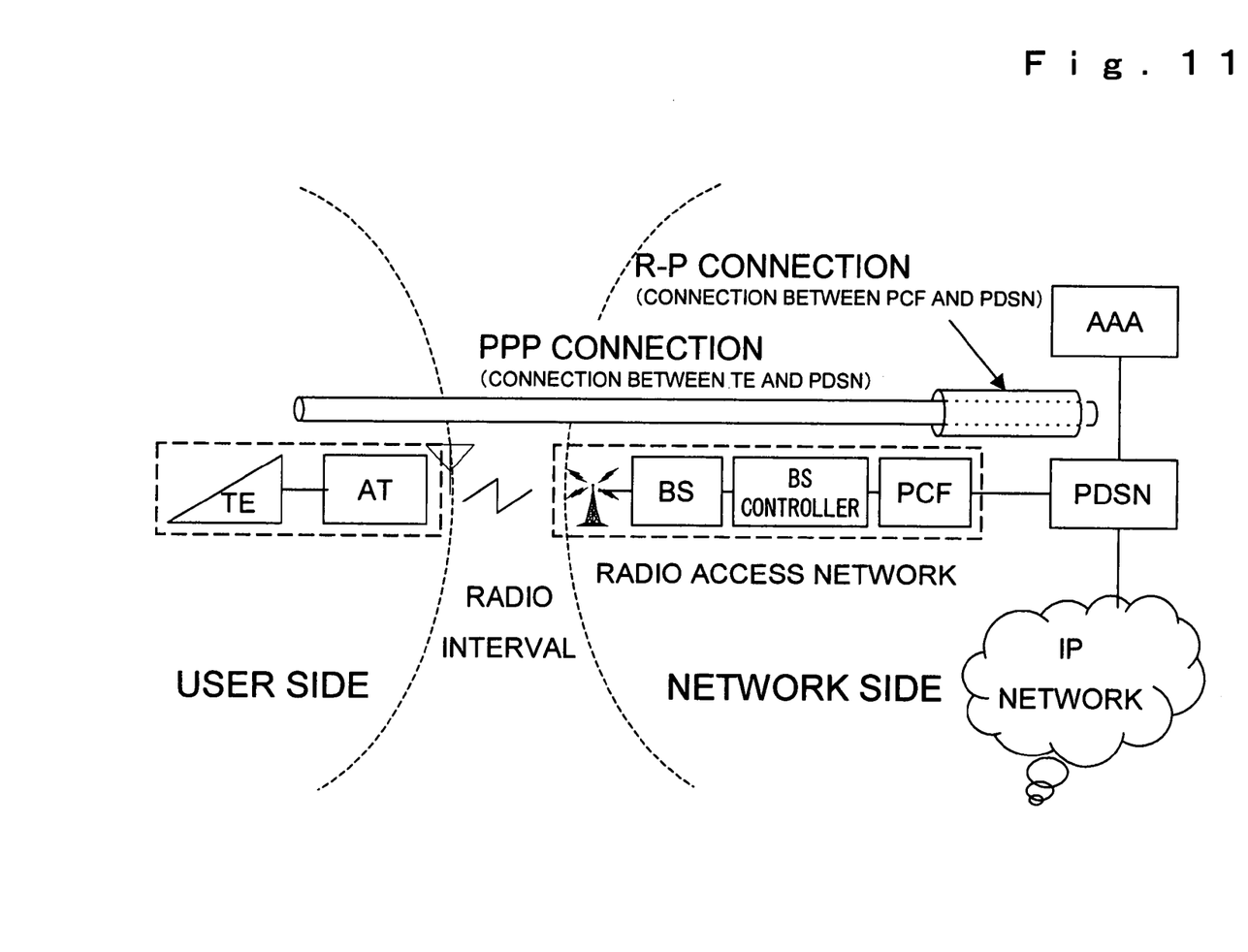
FIG. 11 is a diagram showing the network configuration of a packet network to which the call establishment procedure of the present invention is applied.

As shown in FIG. 11, in cdma2000, which is the next generation mobile communication system being under standardization in 3GPP2 (3rd Generation Partnership Project 2), a base station (BS), a BS controller, a PCF (Packet Control Function), PDSN (Packet Data Serving Node), and an AAA (Authentication, Authorization and Accounting) server are connected on the network side, in order to realize IP data communications. A mobile terminal side or a user side is provided with communication equipment including an AT (Access Terminal) and TE (Terminal Equipment).

The BS establishes a radio channel with the AT. The BS controller controls the BS. The PCF controls data communications in between the BS controller and the PDSN. The PDSN connects a radio access network with an IP network, and terminates the logical link. A PPP connection is a data transmission path established between the TE and the PDSN. An R-P connection is a data communication path which is established between the PCF and the PDSN when the PPP connection is established. The R-P connection is established for each PPP connection and is assigned with a unique identifier.

Figure 18:
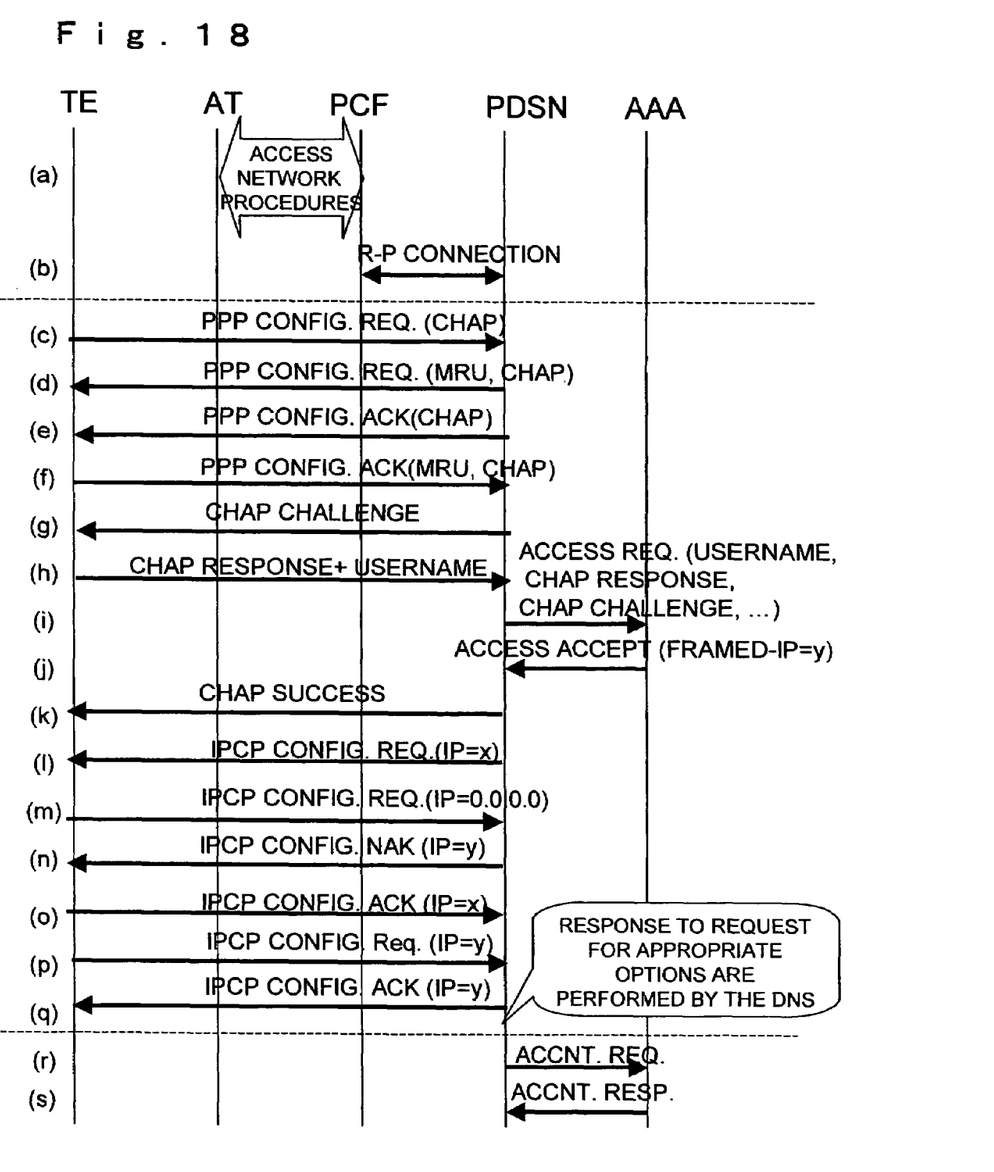
FIG. 18 is a chart showing the sequence in a case where the CHAP is adopted for authentication in the Simple IP (SIP) call.

FIG. 18 is a chart showing the sequence when the CHAP (Challenge Handshake Authentication Protocol) is adopted for authentication in a Simple IP (SIP) call defined in cdma2000. The CHAP is a security function supported on line. In order to protect against unauthorized accessing, PPP encapsulation is used.

Step (a): A radio channel is established between the AT and the radio access network.

Step (b): An individual R-P connection is established between the PCF and the PDSN.

Step (c): The TE requests the PDSN for CHAP authentication.

Step (d): The PDSN requests the TE for the CHAP authentication, and transmits the maximum packet size MRU receivable by the PDSN. Thereby, a radio channel is established between the AT and the radio access network.

Step (e): The CHAP authentication is accepted by the PDSN.

Step (f): The CHAP authentication and the MRU of the PDSN are accepted by the TE.

Step (g): A challenge message for the CHAP authentication is sent from the PDSN to the TE.

Step (h): A challenge response is generated by the TE, and is sent to the PDSN together with a username.

Step (i): The username, the CHAP challenge and the CHAP response are sent from the PDSN to the AAA server by using an authentication protocol.

Step (j): The authentication result (success or failure) and an IP address "y" used by the TE if needed are sent from the AAA server to the PDSN by using the authentication protocol.

Step (k): The authentication result is sent from the PDSN to the TE.

Step (l): When the authentication has been successful, the PDSN requests the TE to use "x" as an IP address of itself.

Step (m): The TE, to which no address has been assigned, requests the PDSN to use "0.0.0.0" as an IP address of itself.

Step (n): The PDSN requests the TE to use the IP address "y".

Step (o): The TE accepts that the PDSN uses "x" as its IP address.

Step (p): The TE requests the PDSN to use "y" as the IP address of itself.

Step (q): The PDSN accepts that the TE uses the IP address "y".

Then, if the TE requests for a DNS server address or the like, an appropriate response is performed.

Step (r): The PDSN requests an authentication server to start charging.

Step (s): The authentication server accepts to start charging.

Figure 19:
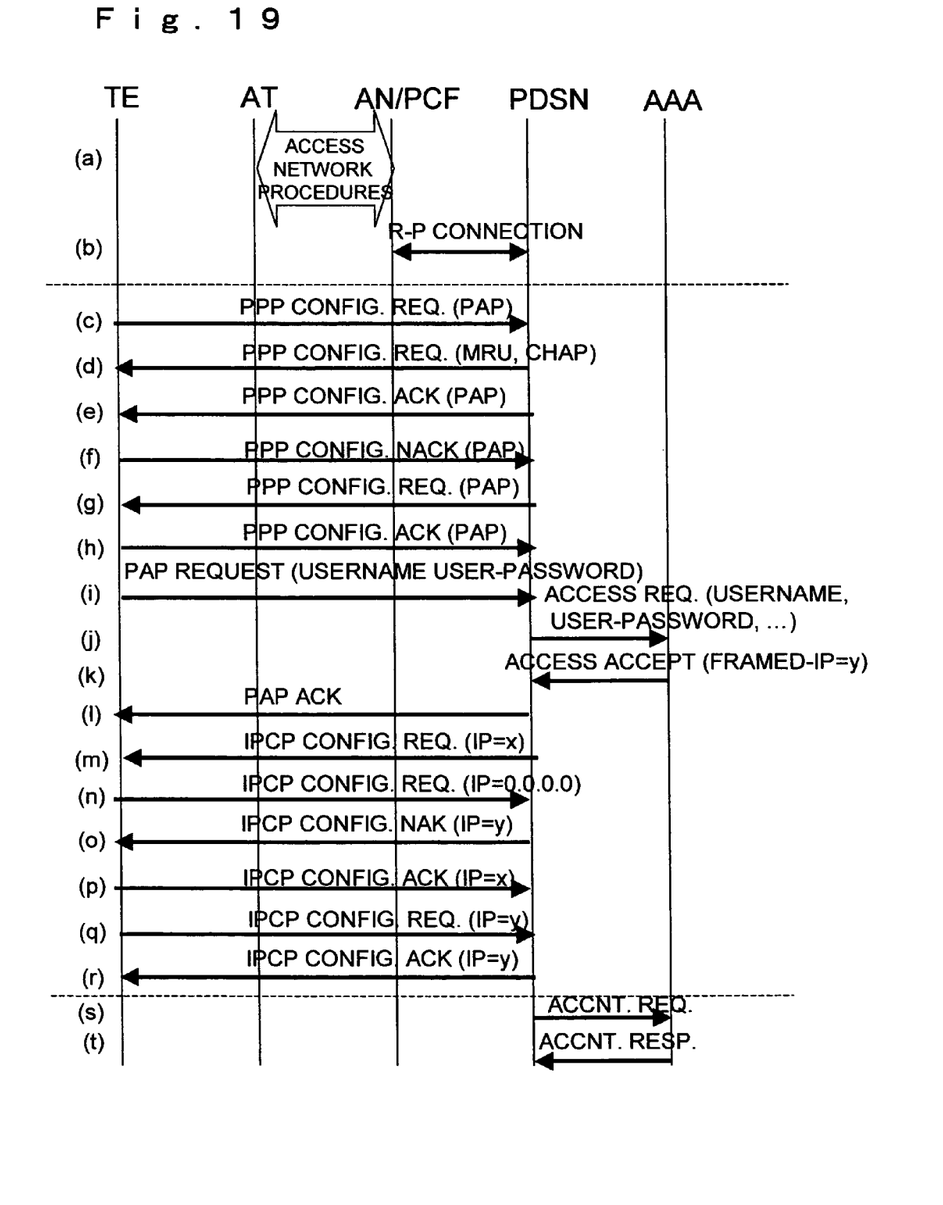
FIG. 19 is a chart showing the sequence in a case where the PAP is adopted for authentication in the Simple IP (SIP) call.

FIG. 19 is a chart showing the sequence in a case where the PAP (Password Authentication Protocol) is adopted for authentication in the Simple IP (SIP) call. The PAP is an authentication protocol used in a PPP connection, in which information such as a password or the like is sent in a plane text (not encoded), different from the CHAP.

Step (a): A radio channel is established between the AT and the radio access network.

Step (b): An individual R-P connection is established between the PCF and the PDSN.

Step (c): The TE requests the PDSN for PAP authentication.

Step (d): The PDSN requests the TE for the PAP authentication, and transmits the maximum packet size MRU receivable by the PDSN. Thereby, a radio channel is established between the AT and the radio access network.

Step (e): The PAP authentication is accepted by the PDSN.

Step (f): The TE requests the PDSN for PAP authentication.

Step (g): The PDSN requests the TE for PAP authentication.

Step (h): The PAP authentication is accepted by the TE.

Step (i): A username and password are sent from the TE to the PDSN.

Step (j): The username and password are sent from the PDSN to the AAA server by using an authentication protocol.

Step (k): The authentication result (success or failure) and an IP address "y" used by the TE if needed are sent from the AAA server to the PDSN by using the authentication protocol.

Step (l): The authentication result is sent from the PDSN to the TE.

Step (m): When the authentication has been successful, the PDSN requests the TE to use "x" as an IP address of itself.

Step (n): The TE, to which no address has been assigned, requests the PDSN to use "0.0.0.0" as an IP address of itself.

Step (o): The PDSN requests the TE to use the IP address "y".

Step (p): The TE accepts that the PDSN uses "x" as its IP address.

Step (q): The TE requests the PDSN to use "y" as the IP address of itself.

Step (r): The PDSN accepts that the TE uses the IP address "y".

Then, if the TE requests for a DNS server address or the like, an appropriate response is performed.

Step (s): The PDSN requests an authentication server to start charging.

Step (t): The authentication server accepts to start charging.

The aforementioned sequences are described in the following non-patent documents:

Simpson, "The Point to Point Protocol (PPP)", RFC 1661, July 1994;

P.R0001, "Wireless IP Network Architecture based on IETF Protocols", 3GPP2, July 2000;

P.S0001-A Version 3.0.0, "Wireless IP Network Standard", 3GPP2, July 2001;

Simpson, "PPP Challenge Handshake Authentication Protocol (CHAP)", RFC 1994, August 1996; and A.S0007-0 version 1.0, "1xEV-DO Inter-Operability Specification (IOS) for CDMA 2000 Access Network Interfaces", 3GPP2, July 2001.

The PPP is a protocol defined for a dial-up connection using a modem, which contains parameters and sequences not used in cdma2000. Thus, it is inefficient if the PPP is used as it is for a call establishment in data communications over a packet exchange network.

For example, in the sequence of using CHAP authentication in the SIP call (FIG. 18), request/reply messages for authenticating the PDSN by the TE are exchanged in Steps (c) and (e). However, these are not performed actually, so they are redundant. Further, in Step (m), the TE sends the IP address (0.0.0.0), and then in Step (n), the PDSN sends the address that the TE should be used. In fact, IP address is always given by the PDSN, whereby the sequence of Step (m) is redundant.

Further, since an uplink speed is low in cdma2000 1X EV-DO, the amount of information must be reduced as much as possible. However, in the PPP, symmetrical sequences are performed in both uplink and downlink, causing low efficiency.

SUMMARY OF THE INVENTION

It is an object of the present invention to reduce redundant steps for authentication in a SIP call, and to reduce the incoming data amount, to thereby provide a call establishment method for a packet exchange network, which is capable of saving the time required for a call establishment.

The present invention is characterized in that the following measures are taken in a call establishment method, in a network comprising: a user side system including terminal equipment (TE) and a radio access terminal (AT); and a network side system including a radio access network provided with a base station (BS) for establishing a radio link with the TE via the AT, and an PDSN for connecting the radio access network with a broadband network, for establishing a PPP connection between the TE and the PDSN.

(1) The steps of sending an authentication request message from the TE to the PDSN, and in reply to the authentication request message, sending, by the AT substitutively, an authentication response message, are included.

(2) The steps of sending an IP address request message from the TE to the PDSN; and in response to the IP address request message by the AT substitutively, assigning an IP address to the TE, are included.

According to the present invention, the following effects can be achieved.

(1) An authentication request of the network requested by the TE of the user side is responded by the AT instead of the PDSN. Thereby, the time period required for the authentication can be saved, and also the communication resources can be saved since the authentication request message and the authentication response message do not cross the radio interval.

(2) An address request message sent from the TE to the PDSN is responded by the AT instead of the PDSN. Thereby, the time period required for assigning the address can be saved, and also the communication resources can be saved since the address request message and the address response message do not cross the radio interval.

BRIEF DESCRIPTION OF THE DRAWINGS

FIG. 7 shows the packet format of a message (Success) sent from the PDSN to the AT.

FIG. 8 shows the packet format of a message (Failure) sent from the PDSN to the AT.

DETAILED DESCRIPTION OF THE PREFERRED EMBODIMENTS

Preferred embodiments of the present invention will be described below with reference to the drawings.

Figure 1:
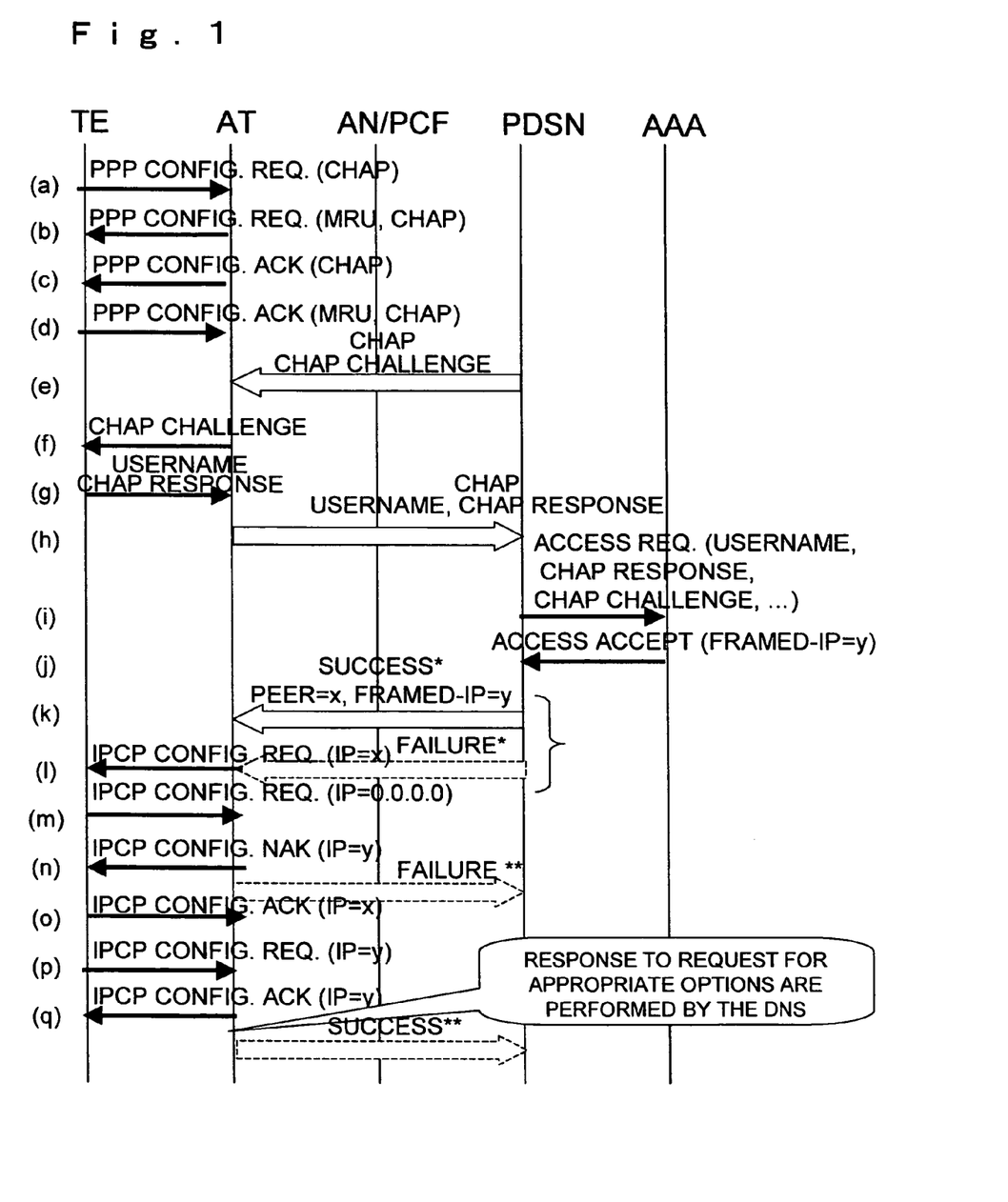
FIG. 1 is a chart showing the sequence of the call establishment procedure (CHAP authentication) according to a first embodiment of the present invention.

FIG. 1 is a chart showing the sequence where a first embodiment of the call establishment procedure according to the present invention is applied, for authentication in a SIP call defined in cdma2000 in the network system described in FIG. 11. In the present embodiment, a time period required for a call establishment is saved by omitting redundant steps from the conventional CHAP.

Step (a): The TE requests the PDSN for CHAP authentication. This message is received by the AT on behalf of the PDSN.

Step (b): The AT requests the TE for the CHAP authentication on behalf of the PDSN, and the maximum packet size MRU receivable by the PTSN (set to the AT beforehand) is transmitted to the TE.

Step (c): The AT accepts the CHAP authentication on behalf of the PDSN.

Step (d): The TE accepts the CHAP authentication and the MRU of the PDSN. This message is also received by the AT on behalf of the PDSN.

Step (e): The PDSN recognizes it as PAP authentication, and sends a challenge message for the CHAP authentication to the AT.

Step (f): The AT sends the challenge message for the CHAP authentication to the TE.

Step (g): The TE generates a CHAP response, which is sent to the PDSN together with a username. This message is also received by the AT on behalf of the PDSN.

Step (h): The AT sends the username and the CHAP response received, to the PDSN.

Step (i): The PDSN sends the username, the CHAP challenge and the CHAP response to the AAA server, by using an authentication protocol.

Step (j): The AAA sends the authentication result (success of failure) and an IP address "y" used by the TE if needed, to the PDSN by using the authentication protocol.

Figure 8:
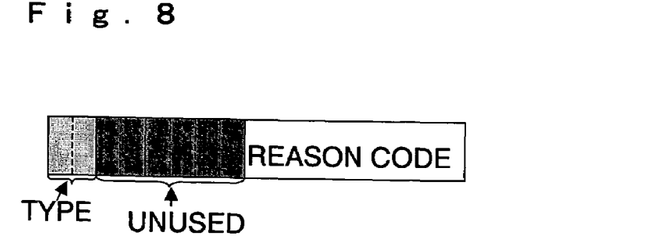

Step (k): If the authentication has been successful, the PDSN sends an IP address "x" used by the PDSN and the IP address "y" used by the TE, to the AT (Success). If the authentication has been failed, a packet in a format described later with reference to FIG. 8 is sent (Failure).

Step (l): In a case of success, the AT requests the TE to use the IP address "x" for the PDSN.

Step (m): The TE, to which no address has been assigned, requests the PDSN to use an IP address "0.0.0.0". This message is also received by the AT on behalf of the PDSN.

Step (n): The AT requests the TE to use "y" as the IP address, on behalf of the PDSN.

Step (o): The TE accepts that the PDSN uses the IP address "x". This message is also received by the AT on behalf of the PDSN.

Step (p): The TE requests the PDSN to use "y" as the IP address of itself. This message is also received by the AT on behalf of the PDSN.

Step (q): The AT accepts that the TE uses the IP address "y". Then, if the TE requests for a DNS server address or the like, an appropriate response will be performed.

It should be noted that if the PPP sequence is failed between the TE and the AT, a message is sent from the AT to the PDSN at that point in a format described later with reference to FIG. 8 (Failure). Further, if the whole sequence is successful between the TE and the AT, the AT may send to the PDSN a massage in a format described in detail later with reference to FIG. 7.

In this way, according to the present embodiment, the network authentication by the terminal equipment (TE) on the user side performed in Steps (a) to (d) is responded by the AT on behalf of the PDSN. Thus, the time period required for the authentication is saved, and the communication resources can be saved as well, since the massages for authentication request and authentication response do not cross the radio interval.

Further, in the SIP call, a request for the IP address from the user side performed in Step (m) is also responded by the AT on behalf of the PDSN. Thereby, the time period required for this response is saved, and the communication resources can be saved as well, since the address request message and the address response message do not cross the radio interval.

Figure 2:
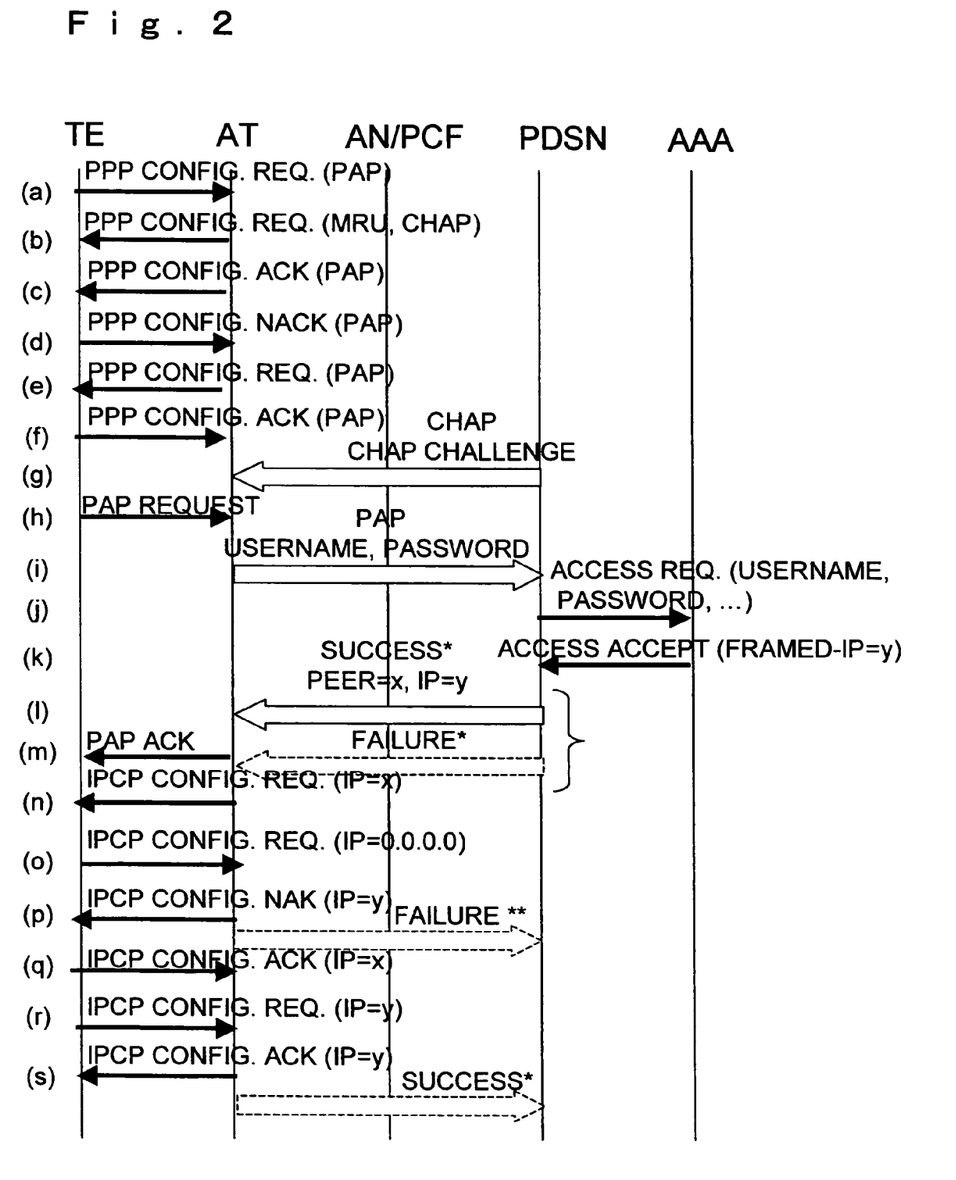
FIG. 2 is a chart showing the sequence of the call establishment procedure (PAP authentication) according to a second embodiment of the present invention.

FIG. 2 is a chart showing the sequence where a second embodiment of the communication method according to the present invention is applied for authentication in a Simple IP (SIP) call defined in cdma2000. In the present embodiment, a time period required for establishing a call is saved by omitting redundant steps from the conventional PAP.

Step (a): The TE requests the PDSN for PAP authentication. This message is received by the AT on behalf of the PDSN.

Step (b): The AT requests the TE for the CHAP authentication, and the maximum packet size MRU receivable by the PTSN (set to the AT beforehand) is transmitted to the TE.

Step (c): The AT accepts the PAP authentication on behalf of the PDSN.

Step (d): The TE requests the PDSN for the PAP authentication. This message is also received by the AT on behalf of the PDSN.

Step (e): The AT requests the PAP authentication on behalf of the PDSN.

Step (f): The TE accepts the PAP authentication of the PDSN. This message is also received by the AT on behalf of the PDSN.

Step (g): The PDSN sends the challenge message for the CHAP authentication to the AE. This message may be sent every timing but before step (g).

Step (h): A username and password are sent from the TE to the PDSN. This message is also received by the AT on behalf of the PDSN.

Step (i): The username and password of the TE are sent from the AT to the PDSN.

Step (j): PAP authentication is recognized on the PDSN. The username and password are sent from the PDSN to the AAA server by using an authentication protocol.

Step (k): The AAA sends the authentication result (success of failure) and an IP address "y" used by the TE if needed, to the PDSN by using the authentication protocol.

Step (l): When the authentication has been successful, an IP address "x" used by the PDSN and IP address "y" used by the TE are sent from the PDSN to the AT. When the authentication has been failure, message (Failure) shown in FIG. 8 is sent from the PDSN to the AT.

Step (m): The authentication result is sent from the AT on behalf of the PDSN to the TE.

Step (n): In a case of success, the AT requests the TE on behalf of the PDSN to use the IP address "x" for the PDSN.

Step (o): The TE, to which no address has been assigned, requests the PDSN to use "0.0.0.0" as an IP address of itself.

Step (p): The AT requests the TE to use "y" as the IP address.

Step (q): The TE accepts that the PDSN uses the IP address "x". This message is also received by the AT on behalf of the PDSN.

Step (r): The TE requests the PDSN to use "y" as the IP address of itself. This message is also received by the AT on behalf of the PDSN.

Step (s): The AT accepts that the TE uses the IP address "y". Then, if the TE requests for a DNS server address or the like, an appropriate response will be performed.

If the PPP sequence is failed between the TE and the AT, a message is sent from the AT to the PDSN at that time (Failure) In contrast, if the whole sequence is successful between the TE and the AT, the AT may send a message to the PDSN.

Figure 3:
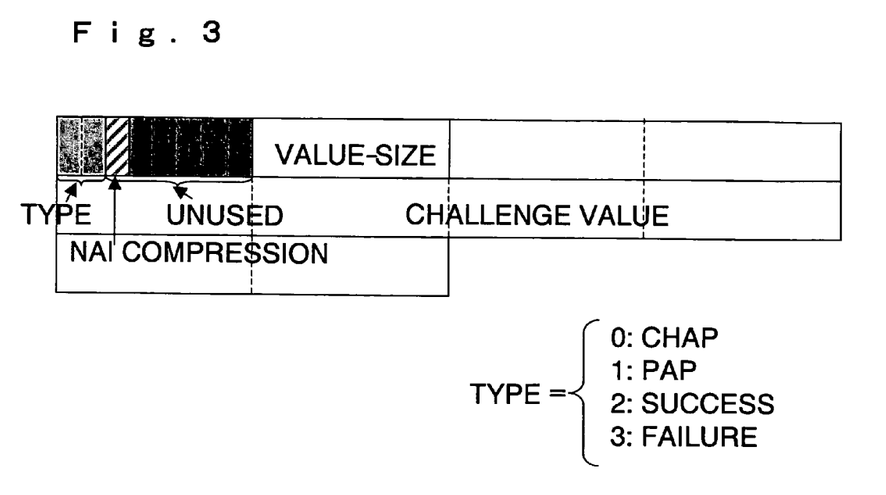
FIG. 3 shows the packet format of a CHAP Challenge message according to the present invention.
Figure 4:
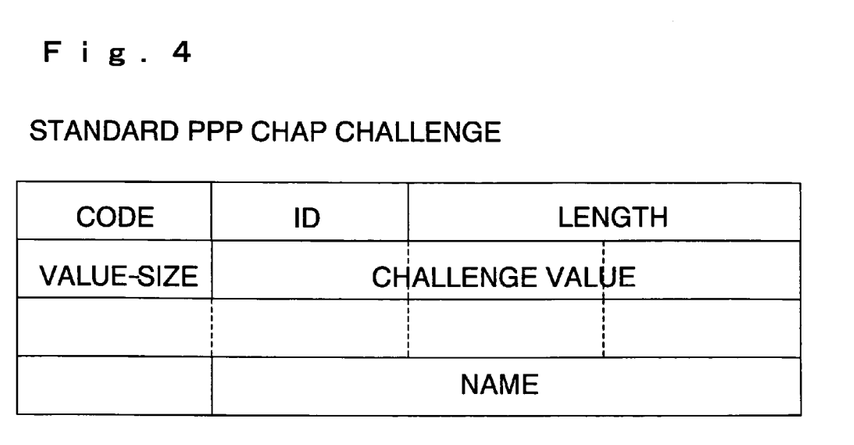
FIG. 4 shows the packet format of a CHAP Challenge message of the conventional standard PPP.

FIG. 3 shows the packet format of a CHAP challenge message according to the present invention, which is sent from the PDSN to the AT in Step (e) of FIG. 1 and in Step (g) of FIG. 2. FIG. 4 shows the packet format of a CHAP challenge message of the conventional, standard PPP.

In the present invention, since it is enough to define four types of formats including CHAP, PAP, Success and Failure as formats of packets crossing the radio interval, 2 bits at the head are used for identifying the type. Thereby, the Code field, necessary for the standard PPP format, is not required. Instead, the type and compression information (NAI compression) are registered in the 1-bite area.

In the type area, information showing whether the packet is for the CHAP, PAP Success or Failure, is registered. In the NAI compression area, it is registered whether the data stored in the Name field is compressed data, described later, or not.

Further, in the present embodiment, the same value can be used as ID in the request/replay messages, whereby there is no need to manage by the PDSN. Moreover, since all PPP packets flow on R-P connections between the PCF and the PDSN, and the R-P connection is identified for each connection AT uniquely, no ambiguity is caused without ID in the PDSN, whereby it can be omitted. Further, although the Length field stores the length of the whole packet (Code to the end of Name), only the Challenge Value is variable except the Name, and this value is stored in the Value-size field. Thereby, no ambiguity is caused even though the Length field is omitted. Moreover, the TE dose not authenticate the PDSN in the present invention, whereby the last Name will never by used.

According to the aforementioned aspects, the packet format of the CHAP challenge message in the present invention (FIG. 3) can be shortened by 1 bite for the ID field, 2 bytes for the Length field and 3 bytes for the Name field, that is, 6 bytes in total, comparing with that of the conventional standard PPP (FIG. 4).

Figure 5:
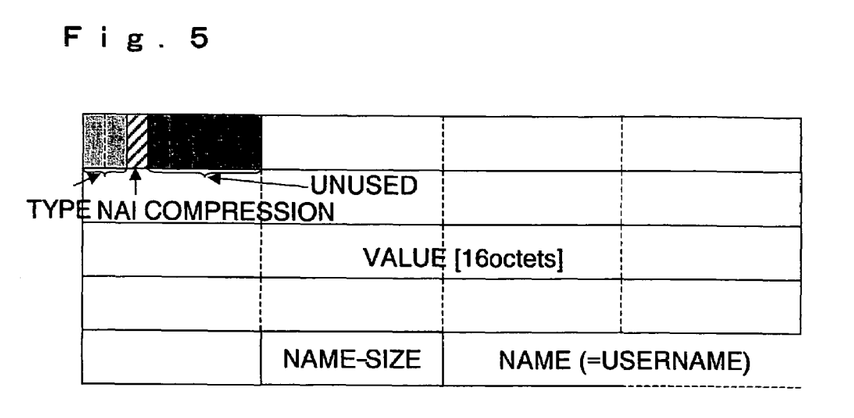
FIG. 5 shows the packet format of a CHAP Response message according to the present invention.
Figure 6:
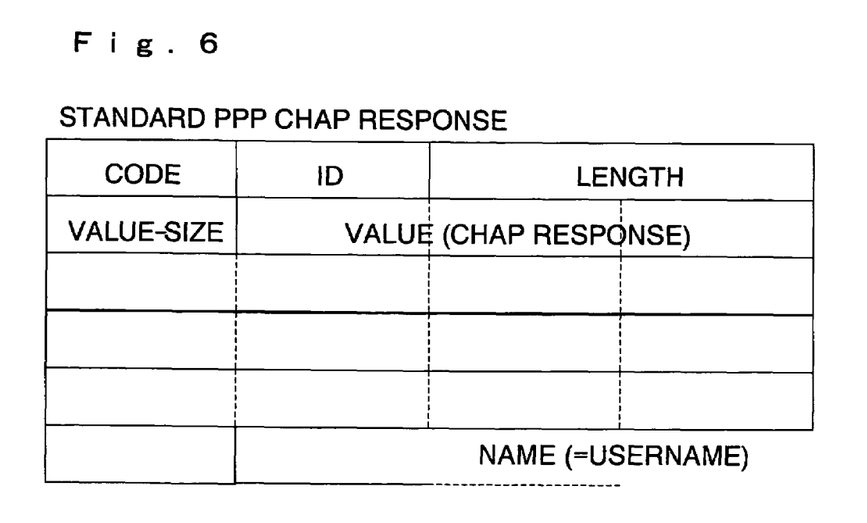
FIG. 6 shows the packet format of a CHAP Response message of the conventional standard PPP.

FIG. 5 shows the packet format of a CHAP response message sent from the AT to the PDSN, and FIG. 6 shows the packet format of a CHAP response message in the conventional standard PPP.

As same as the aforementioned case of the CHAP challenge message, the Code field is used as the Type area and the NAI compression area. Further, since the CHAP response value is fixed for 16 bytes, the Value-size field is not required. However, the Name field stores the username of the TE and this is variable, therefore the Name-size field is indispensable.

According to the aforementioned aspects, the packet format of the CHAP response message in the present invention (FIG. 5) is shortened by 1 bite for the ID field, 2 bytes for the Length field and 1 byte for the Value-size field but increased by 1 byte for the Name-size field. Therefore, it can be shortened by 3 bytes in total, comparing with that of the conventional standard PPP (FIG. 6).

Figure 7:
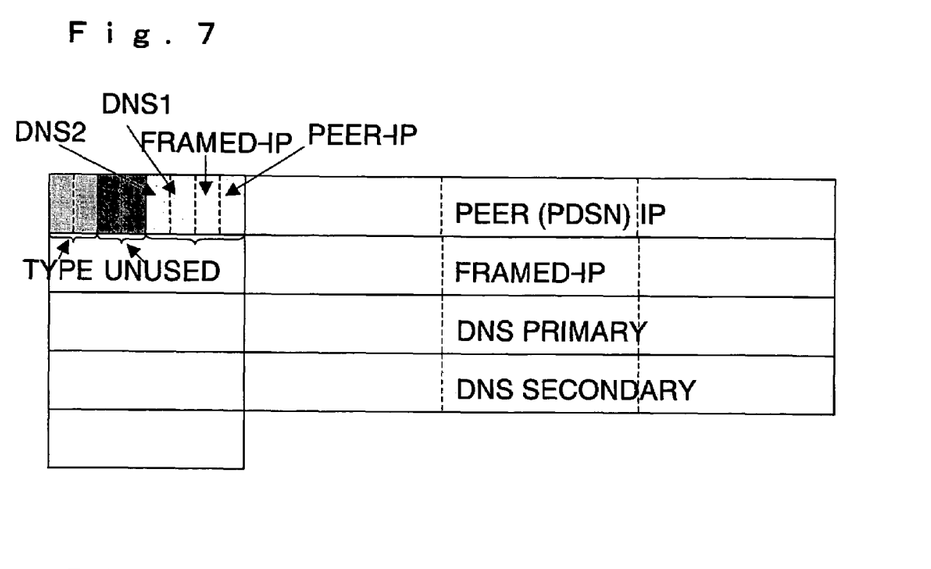

FIG. 7 shows the packet format of a message (Success) sent from the PDSN to the AT in Step (k) of FIG. 1 and in Step (l) of FIG. 2. The values required by the TE in the PPP sequence are: an IP address of the PDSN (gateway address for the TE), an IP address used by the TE (Framed-IP), and primary and secondary DNS server IP addresses. These addresses are sent from the PDSN to the AT in a batch. In the present embodiment, IPv4 is assumed and the length of all addresses is 4 octets, whereby no ambiguity is caused even though the packet length is not defined.

FIG. 8 shows the packet format of a message (Failure) selectively sent instead of the aforementioned message (Success), in which format an identifier, set arbitrary, indicating the reason of the failure, is stored in the Reason Code field.

Figure 9:
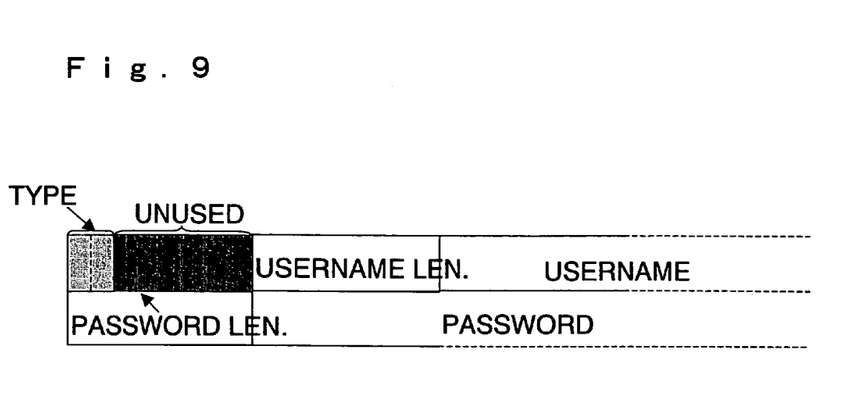
FIG. 9 shows the packet format of a PAP Request message sent from the AT to the PDSN.
Figure 10:
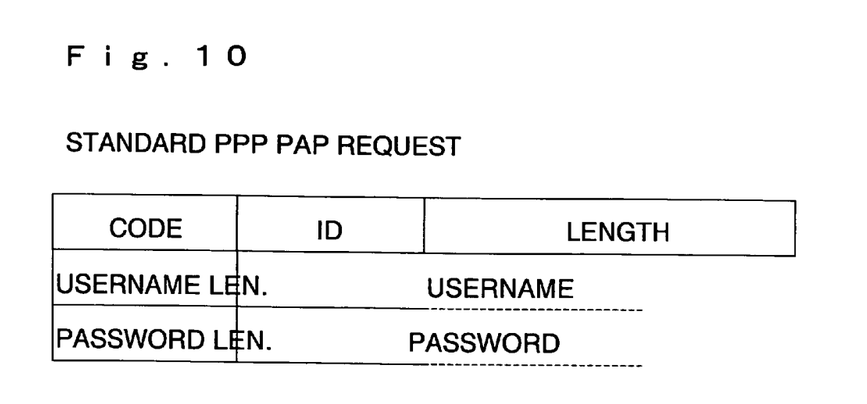
FIG. 10 shows the packet format of a PAP Response message of the conventional standard PPP.

FIG. 9 shows the packet format of a PAP request message sent from the AT to the PDSN in Step (i) of FIG. 2, and FIG. 10 shows the packet format of a PAP request message in the conventional, standard PPP.

As same as the case of the aforementioned CHAP challenge message, the ID field and the Length field are omitted, whereby the packet length can be shortened by 3 bytes in total.

Next, an explanation will be given for an algorithm for compressing the data amount of the NAI (Network Access Identifier), to be inserted to the Name field of the CHAP response described with reference to FIG. 5 and to the Username field of the PAP request described with reference to FIG. 9, in order to reduce the incoming (from AT to PDSN) information amount.

Figure 12:
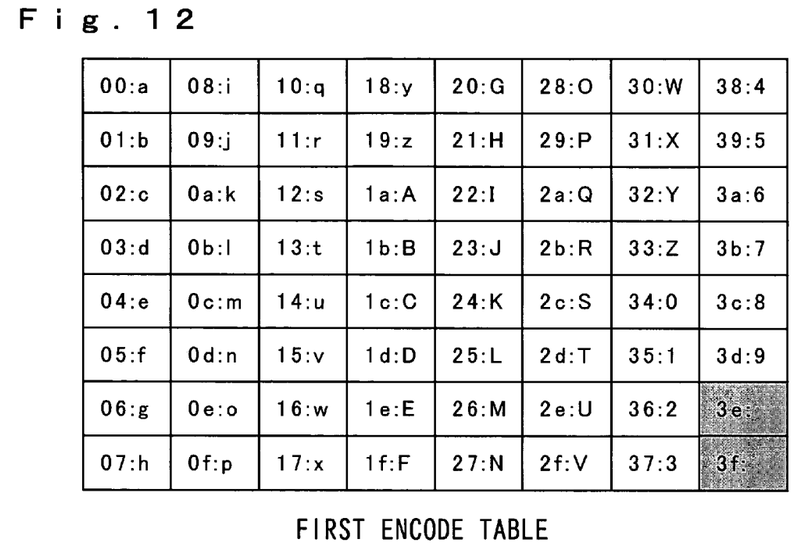
FIG. 12 shows an example of a first encode table used for encoding/decoding the NAI.
Figure 13:
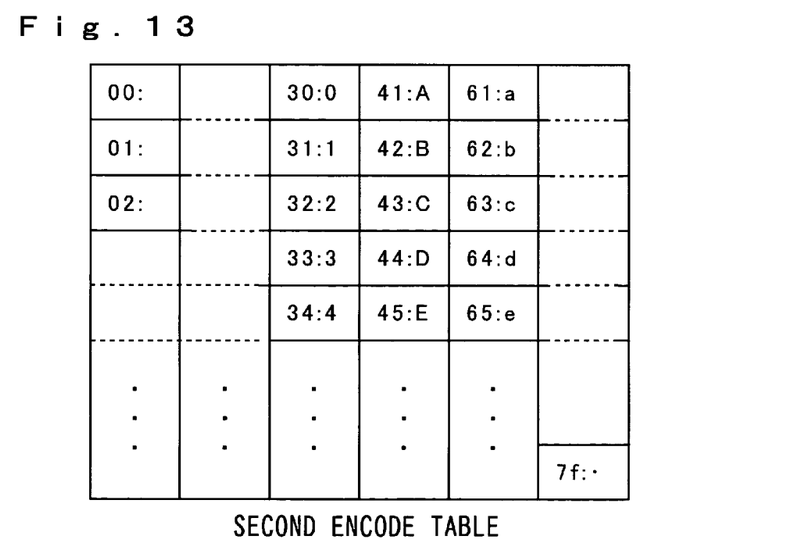
FIG. 13 shows an example of a second encode table used for encoding/decoding the NAI.
Figure 14:
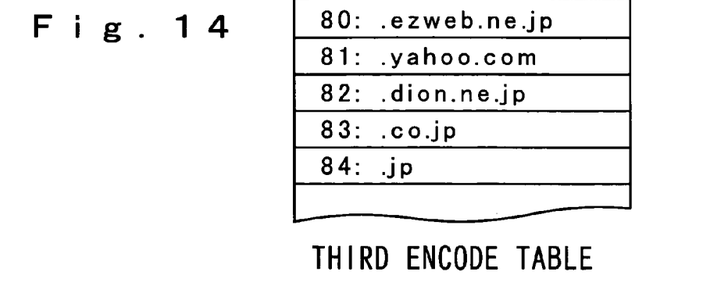
FIG. 14 shows an example of a third encode table used for encoding/decoding the NAI.

FIG. 12 shows an example of a first encode table used for encoding/decoding the NAI. In the present embodiment, the following tables are prepared in advance, that is: a first encode table for uniquely relating 62 characters, including the respective capital letters (A to Z) and small letters (a to z) of the alphabets and 10 integers (0 to 9), to 62 kinds of codes 0x00 to 0x3d (0x is the abbreviation of the hexadecimal notation) among the 64 kinds of codes 0x00 to 0x3f which can be written in 6 bits, as shown in FIG. 12; a second encode table for uniquely relating alphanumeric characters, symbols, and the like to the ASCII codes of 0x00 to 0x7f written in 8 bits, as shown in FIG. 13; and a third encode table for uniquely relating certain character strings such as "ezweb-.ne.jp", "yahoo.com", and "dion.ne.jp" which are frequently used, to respective codes of 0x80 to 0xff written in 8 bits, as shown in FIG. 14.

Further, in the present embodiment, two codes, "0x3f" and "0x3e", other than the aforementioned 62 kinds of codes among the 64 kinds codes are defined as first and second special codes, respectively. Then, the second special codes "0x3e" is added just before respective codes encoded according to the second and the third encode tables, that is, 0x00 to 0x7f and 0x80 to 0xff, so as to distinguish these codes from others, and the first special code "0x3f" is related to "@" and ". (period)".

Figure 15:
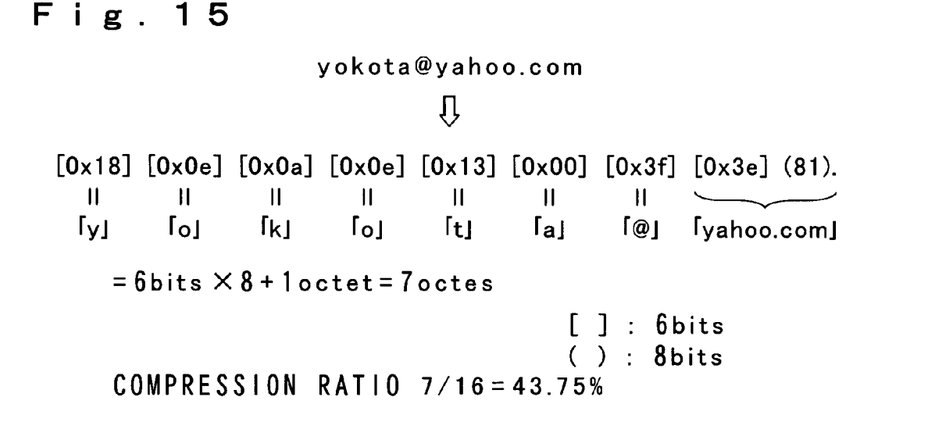
FIG. 15 schematically shows an example of a compression method of the NAI according to the present invention.

FIG. 15 schematically shows an example of a compression method of the NAI according to the present invention. Here, let's think about encoding of identifying information "yokota@yahoo.com".

Respective alphabets constituting "yokota" are encoded to 6-bitcodes, [0x18(=y)], [0x0e(=o)], [0x0a(=k)], [0x0e(=o)], [0x13(=t)], and [0x00(=a)], according to the first encode table shown in FIG. 12. "@" is encoded to the first special code [3f]. "yahoo.com" is encoded to an 8-bit code [0x81] according to the third encode table shown in FIG. 14, and the second special code [0x3e] is added just before it so as to indicate that the code "0x81" is encoded according to the third encode table. Consequently, the total amount of the data becomes 6-bit code by eight and an 8-bit code, that is, 56 bits (=7 octets) in total. On the other hand, if the whole character string is represented by the ASCII codes in the conventional manner, it becomes 16 octets for 16 characters. Thereby, the compression ratio of 43.75% (7/16) can be achieved according to the present embodiment.

Figure 16:
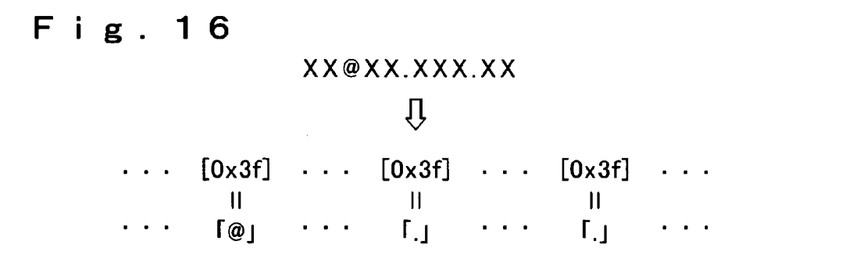
FIG. 16 schematically shows another example of a compression method of the NAI according to the present invention.

FIG. 16 schematically shows another example of a compression method according to the present embodiment. Here, let's think about encoding of a character string xx@xx.xx.xx, containing "@" and ", (comma)" together.

In the present embodiment, the 6-bit first special code "0x3f" is assigned to "@", and the same code "0x3f" is also assigned to ". (period)". Then, when decoding, only the first special code "0x3f" appearing first, that is, the first special code "0x3f" positioned at the leftmost in the describing order is encoded to "@", and all first special codes "0x3f" appearing thereafter are encoded to ".". Thereby, "@" and "." are surely distinguishable even though the same special code "0x3f" is assigned to the both.

Figure 17:
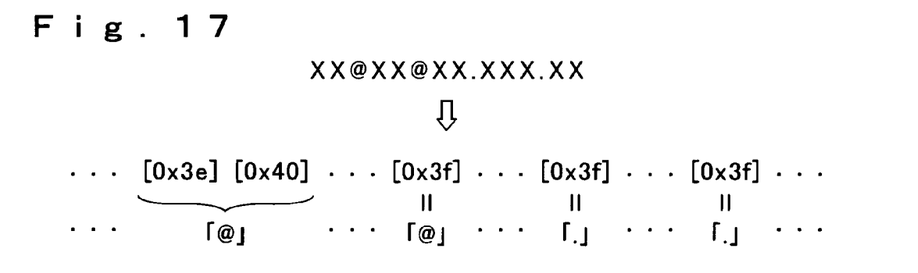
FIG. 17 schematically shows yet another example of a compression method of the NAI according to the present invention.

FIG. 17 schematically shows yet another example of a compression method according to the present embodiment. Here, let's think about a character string xx@xx@xx.xx.xx, containing a number of "@" marks.

In the encoding method described with reference to FIG. 16, a number of "@" marks are not distinguishable. To cope with this, in the present embodiment, the first special code "0x3f" is assigned only to "@" appearing the last in the same manner as the aforementioned case, and the ASCII code is assigned to "@" marks other than the last one. With this configuration, a character string with a number of "@" marks can be encoded in the same manner.

Note that in a case that a packet containing identification information encoded in the aforementioned manner is received and decoded, 6-bit codes belonging to the aforementioned 62 kinds of codes are decoded according to the first encode table, and the first special codes "0x3f" are decoded based on the appearing positions, that is, the first special code "0x3f" appearing first is decoded to "@", and every first special codes "0x3f" other that the first one is decoded to ".", in the opposite manner to the aforementioned case. An ASCII code (0x00 to 0x7f) following the second special code "0x3e" is decoded according to the second encode table, and an 8-bit code (0x80 to 0xff) following the second special code "0x3e" is decoded according to the third encode table.

What is claimed is:

1. A call establishment method for a packet exchange network, in a network comprising: a user side system including terminal equipment (TE) and a radio access terminal (AT); and a network side system including a radio access network provided with a base station (BS) for establishing a radio link with the TE via the AT, and an PDSN for connecting the radio access network with a broadband network, the method for establishing a PPP connection between the TE and the PDSN comprising the steps of:

sending an authentication request message from the TE to the PDSN;

in reply to the authentication request message, sending an authentication response message by the AT substitutively;

sending a user authentication request adopting a CHAP from the PDSN to the AT; and in response to the user authentication request, sending the user authentication request adopting the CHAP from the AT to the TE, wherein a packet format of the user authentication request sent from the PDSN to the AT does not contain at least one of an ID field, a Length field and a Name field.

2. The call establishment method for the packet exchange network as claimed in claim 1, further comprising the steps of:

sending an IP address request message from the TE to the PDSN; and in response to the IP address request message by the AT substitutively, assigning an IP address to the TE.

3. The call establishment method for the packet exchange network as claimed in claim 1, further comprising the steps of:

in response to the user authentication request, sending a user authentication response adopting the CHAP from the TE to the PDSN;

receiving, by the AT substitutively, the user authentication response; and sending the user authentication response, received by the AT substitutively, from the AT to the PDSN, wherein a packet format of the user authentication response sent from the AT to the PDSN does not contain the ID field, the Length field and a Value-size field.

4. The call establishment method for the packet exchange network as claimed in claim 1, further comprising the steps of:

in response to the user authentication request, sending a user authentication response adopting a PAP from the TE to the PDSN;

receiving, by the AT substitutively, the user authentication response; and sending the user authentication response, received by the AT substitutively, from the AT to the PDSN, wherein a packet format of the user authentication response sent from the AT to the PDSN does not contain the ID field and the Length field.

5. The call establishment method for the packet exchange network as claimed in claim 2, further comprising:

in response to the user authentication request, sending a user authentication response adopting the CHAP from the TE to the PDSN;

receiving, by the AT substitutively, the user authentication response; and sending the user authentication response, received by the AT substitutively, from the AT to the PDSN, wherein a packet format of the user authentication response sent from the AT to the PDSN does not contain the ID field, the Length field and a Value-size field.

6. The call establishment method for the packet exchange network as claimed in claim 2, further comprising:

in response to the user authentication request, sending a user authentication response adopting a PAP from the TE to the PDSN;

receiving, by the AT substitutively, the user authentication response; and sending the user authentication response, received by the AT substitutively, from the AT to the PDSN, wherein a packet format of the user authentication response sent from the AT to the PDSN does not contain the ID field and the Length field.

7. A call establishment method for a packet exchange network, in a network comprising: a user side system including terminal equipment (TE) and a radio access terminal (AT); and a network side system including a radio access network provided with a base station (BS) for establishing a radio link with the TE via the AT, and an PDSN for connecting the radio access network with a broadband network, and in which a first encode table for uniquely relating 62 characters including all capital and small letters of alphabets and integers of "0" to "9" to 62 kinds of codes among 64 kinds of codes which can be written in 6 bits, a second encode table for uniquely relating certain alphanumeric characters and symbols to ASCII codes of 0x00 to 0x7F (from 00 to 7F in a hexadecimal notation, hereinafter referred similarly), a third encode table for uniquely relating certain character strings to 8-bit codes of 0x80 to 0xFF, and a forth encode table for relating at least one special character to a first special code which is one of two codes other than the 62 kinds of codes among the 64 kinds of codes, are prepared in advance, the method for establishing a PPP connection between the TE and the PDSN comprising:

sending an authentication request message from the TE to the PDSN;

in reply to the authentication request message, sending an authentication response message by the AT substitutively;

when encoding identification information to be registered in a transmission packet:

encoding alphabets and numbers belonging to the 62 characters according to the first encode table;

encoding the special character according to the forth encode table;

encoding symbols other than the 62 characters according to second encode table;

before the ASCII code, adding a second special code which is the other of the two codes other than the 62 kinds of codes among the 64 kinds of codes;

encoding the certain character string according to the third encode table; and adding the second special code before the 8-bit code.

8. The call establishment method for the packet exchange network as claimed in claim 7, wherein the special character is "@" or ".".

9. A call establishment method for a packet exchange network, in a network comprising: a user side system including terminal equipment (TE) and a radio access terminal (AT); and a network side system including a radio access network provided with a base station (BS) for establishing a radio link with the TE via the AT, and an PDSN for connecting the radio access network with a broadband network, and in which a first encode table for uniquely relating 62 characters including all capital and small letters of alphabets and integers of "0" to "9" to 62 kinds of codes among 64 kinds of codes which can be written in 6 bits, a second encode table for uniquely relating certain alphanumeric characters and symbols to ASCII codes of 0x00 to 0x7F, a third encode table for uniquely relating certain character strings to 8-bit codes of 0x80 to 0xFF, and a forth encode table for relating at least one special character to a first special code which is one of two codes other than the 62 kinds of codes among the 64 kinds of codes, are prepared in advance, the method for establishing a PPP connection between the TE and the PDSN comprising:

sending an authentication request message from the TE to the PDSN;

in reply to the authentication request message, sending an authentication response message by the AT substitutively;

when decoding identification information registered in a received packet:

decoding the 6-bit codes belonging to the 62 kinds of codes according to the first encode table;

decoding the first special code according to the forth encode table;

decoding the ASCII code following the second special code according to the second encode table; and decoding the 8-bit code following the second special code according to the third encode table.

10. The call establishment method for the packet exchange network as claimed in claim 9, wherein the special character is "@" or ".", the first special code appearing first is decoded to "@", and every first special code appearing thereafter is decoded to ".".

* * * * *